(12) United States Patent
Castelli et al.

(10) Patent No.: US 12,474,864 B2
(45) Date of Patent: Nov. 18, 2025

(54) DATA SENSING WITH ERROR CORRECTION

(71) Applicant: Micron Technology, Inc., Boise, ID (US)

(72) Inventors: Mauro Castelli, Avezzano (IT); Luigi Pilolli, L'Aquila (IT)

(73) Assignee: Micron Technology, Inc., Boise, ID (US)

( * ) Notice: Subject to any disclaimer, the term of this patent is extended or adjusted under 35 U.S.C. 154(b) by 167 days.

(21) Appl. No.: 18/243,344

(22) Filed: Sep. 7, 2023

(65) Prior Publication Data

US 2024/0086104 A1    Mar. 14, 2024

Related U.S. Application Data

(60) Provisional application No. 63/405,075, filed on Sep. 9, 2022.

(51) Int. Cl.
| | | |
|---|---|---|
| G11C 7/00 | (2006.01) | |
| G06F 3/06 | (2006.01) | |
| G11C 16/20 | (2006.01) | |
| G11C 16/26 | (2006.01) | |

(52) U.S. Cl.
CPC .......... *G06F 3/0656* (2013.01); *G06F 3/0619* (2013.01); *G06F 3/0679* (2013.01); *G11C 16/20* (2013.01); *G11C 16/26* (2013.01)

(58) Field of Classification Search
CPC ....... G11C 7/1051; G11C 7/1078; G11C 7/22; G11C 7/106; G11C 7/1057
USPC ...................................... 365/189.05
See application file for complete search history.

(56) References Cited

U.S. PATENT DOCUMENTS

| | | | | |
|---|---|---|---|---|
| 6,449,205 B1 * | 9/2002 | Chou | ................... | G11C 11/406 365/189.05 |
| 10,490,240 B2 * | 11/2019 | Murakami | ............... | G11C 7/22 |
| 11,056,191 B2 * | 7/2021 | Kwon | .................... | G11C 16/14 |

* cited by examiner

*Primary Examiner* — Son T Dinh
(74) *Attorney, Agent, or Firm* — Lowenstein Sandler LLP

(57) ABSTRACT

Multiple copies of a stored data are sensed from a subset of memory cells of an array of memory cells into a plurality of latch elements in a page buffer coupled to the array of memory cells. Two or more latch elements are selected by enabling a respective select line of each of the two or more latch elements. An output data is determined based on a sensing of the conducting line driven by the two or more latch elements.

17 Claims, 14 Drawing Sheets

DATA SENSING WITH ERROR CORRECTION

CROSS REFERENCE TO RELATED APPLICATIONS

This application claims the benefit of priority under 35 U.S.C. § 119 to U.S. Provisional Patent Application No. 63/405,075, filed Sep. 9, 2022, which is hereby incorporated by reference herein in its entirety.

TECHNICAL FIELD

Embodiments of the disclosure relate generally to memory sub-systems, and more specifically, relate to memory sub-systems configured to perform data sensing with error correction.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
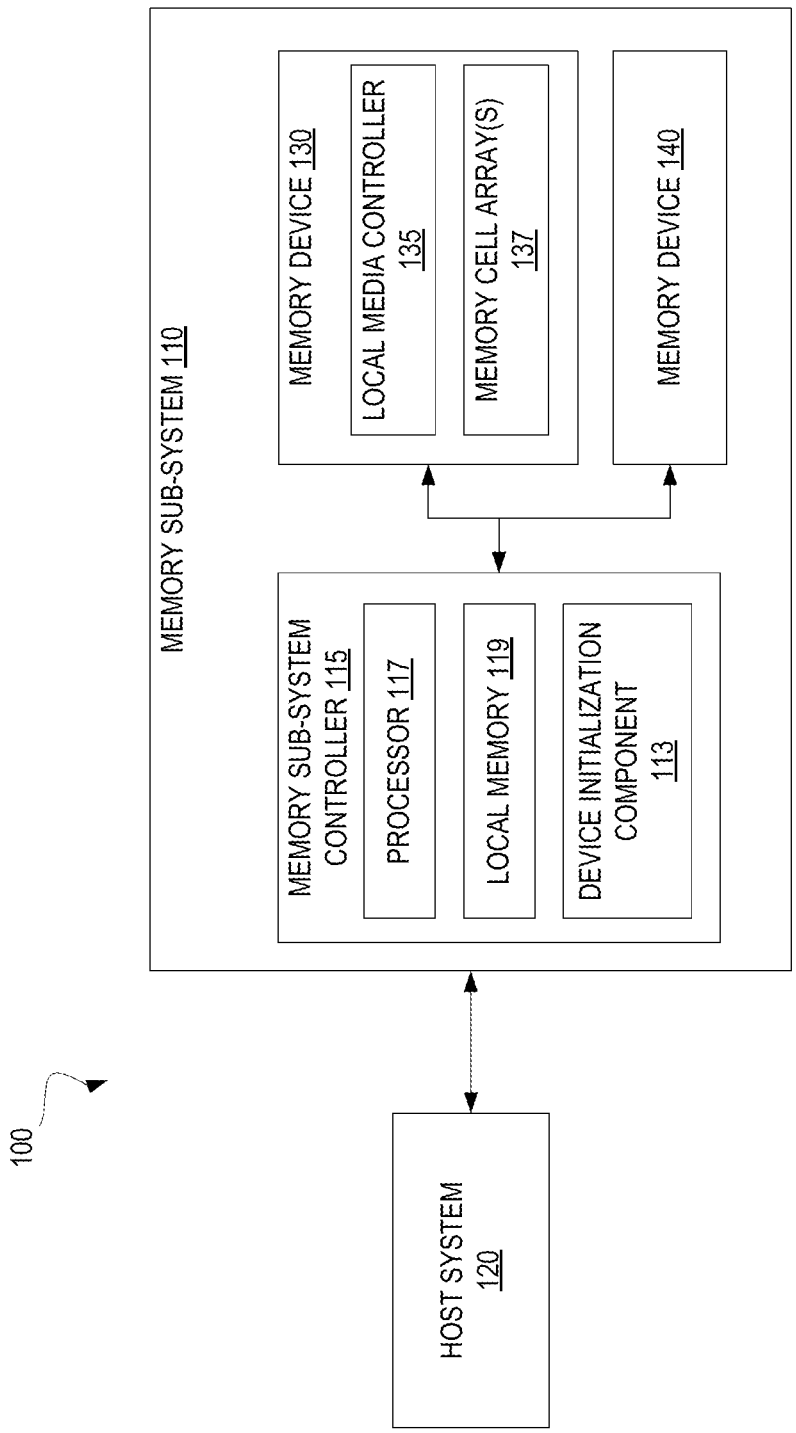
FIG. 1A illustrates an example computing system that includes a memory sub-system in accordance with some embodiments of the present disclosure.

Aspects of the present disclosure are directed to memory sub-systems configured to perform data sensing with error correction. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1A. A non-volatile memory device is a package of one or more dies. Each die can consist of one or more planes. For some types of non-volatile memory devices (e.g., NAND devices), each plane consists of a set of physical blocks. Each block includes a set of pages. Each page consists of a set of memory cells. A memory cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell can be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Depending on the cell type, each memory cell can store one or more bits of binary information, and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

The memory sub-system may support different operations with the memory device, including a read operation for reading data from the memory device. As part of a read operation, one or more data errors may occur, depending on the manner in which it is performed. A read operation, for example, may involve obtaining data from a set of memory cells of a memory device (e.g., a page of memory cells) and placing it into a page buffer (i.e., as part of a first sense operation), and then outputting the data from the page buffer onto a data bus (i.e., as part of a second sense operation). Errors may occur randomly as part of each sense operation (e.g., where a data bit of 1 is sensed as a 0, or visa-versa) and/or on account of defective memory components (e.g., where a memory cell, bitline, or register element always outputs a 0 or 1).

The memory sub-system can include features to compensate for defective memory components (e.g., providing redundant columns in the page buffer), and the parameters of the read operation can be optimized to reduce the rate of errors experienced during each sense (e.g., by adjusting a read level voltage, a timing and/or sequence of operations, or the like). However, when a memory sub-system is first initialized (e.g., when first powered on), defect compensation features are not yet enabled, and the optimized read parameters are not yet available. That is, the optimized read parameters (along with other initialization data) must first be loaded from the memory device (e.g., from a read-only portion of the memory device where such parameters are stored). In order to retrieve the initialization data (or any other data), the memory sub-system may rely on a set of default read parameters, which may be hardcoded in the circuitry of the memory sub-system. However, since the default parameters are not optimized (and features like column redundancy are disabled), it is expected that a read operation performed with these default parameters will produce a non-trivial number of bit errors. Additional measures, therefore, must be taken to ensure that the read operation is free of data errors.

Aspects of the present disclosure address the above and other deficiencies by employing data redundancy and utilizing a sense operation with error correction to ensure a fault-tolerant read operation. Data (e.g., initialization data containing the optimized read parameters), for example, may be stored redundantly, as multiple copies, on the memory device. When retrieved, the multiple copies can be compared to one another to determine whether a read error has occurred and what a correct output should be. In some cases, copies of the data may be stored in bit-inverted form, which may provide for a more robust error detection mechanism (e.g., on account of an asymmetric error rate experienced between stored 0's and stored 1's).

In some memory sub-systems and/or memory devices, only a limited number of latch elements of the page buffer can be selected for output at a time. Such memory sub-systems and/or memory devices are only capable of generating a single column select signal for a latch array of the page buffer (i.e., for selection of a single latch element in the latch array). However, given the number of redundant copies needed to ensure data integrity, retrieval of the initialization data becomes a temporally expensive operation. Moreover, the decoder circuitry required to compare the multiple copies and determine a correct output can be relatively large and complex.

Embodiments of the present disclosure minimize such issues by employing a sense operation with error correction, whereby multiple latch elements, each containing sensed copies of the same data (e.g., obtained through a first sense operation), are selected such that they collectively drive one or more common conducting lines on which an output data is sensed. Memory sub-systems and/or memory devices of the present disclosure, for example, may include a column select line (CSL) signal generator that is capable of generating multiple select signals for a latch array simultaneously, allowing for the concurrent selection of multiple latch elements in the latch array. In this way, latch elements containing copies of the same data can be selected simultaneously, with each copy reinforcing the signal driven on the conducting line. To the extent that an error is present with respect to a particular copy, the signal driven by the other copies is able to compensate for the error, allowing for the correct data to be sensed on the conducting line.

Embodiments of the present disclosure, thus, have the benefit of performing error correction as part of the sensing operation itself. Since multiple copies of the data are sensed simultaneously, the number of operations that must be performed to obtain the desired data can be significantly reduced (i.e., reduced by a multiplicity factor). Furthermore, the need for decoder circuitry could be obviated entirely, or its size and complexity greatly reduced as fewer comparisons are necessary (i.e., reduced by the multiplicity factor). Moreover, as noted above, the selection of multiple copies serves to reinforce the signal output to the conducting line for sensing, even in instances where an error is present, which may provide a higher immunity to noise resulting in a more accurate sensing operation.

FIG. 1A illustrates an example computing system 100 that includes a memory sub-system 110 in accordance with some embodiments of the present disclosure. The memory sub-system 110 can include media, such as one or more volatile memory devices (e.g., one or more memory devices 140), one or more non-volatile memory devices (e.g., one or more memory devices 130), or a combination thereof.

A memory sub-system 110 can include a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130, 140) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory devices 130) include negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell.

In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory devices 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 ("controller") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130. In some embodiments, the memory devices 130 include local media controllers 135 that operate in conjunction with memory sub-system controller 115 to execute operations on one or more memory cells of the memory devices 130. In some embodiments, at least some of the functionality described herein as being performed by the memory sub-system controller 115 may be performed by the local media controller 135. In some embodiments, an external controller (e.g., memory sub-system controller 115) can externally manage the memory device 130 (e.g., perform media management operations on the memory device 130). In some embodiments, at least some of the functionality described herein as being performed by the local media controller 135 may be performed by an external controller, such as memory sub-system controller 115. In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 can include a device initialization component 113 that can be used during initialization, for example, to retrieve optimized operation parameters (along with other initialization data) from the memory device 130. For instance, when the computing system 100 and/or memory sub-system 110 is first powered on, the device initialization component 113 may initiate a read operation to retrieve initialization data stored on memory device 130. Since optimized parameters are not available at initialization, the read operation may be performed using default read operation parameters. As discussed above, it is expected that a read operation performed with these default parameters will produce a non-trivial number of bit errors, and additional measures may be taken to ensure that the read operation is free of data errors. Further detail regarding the operation of the device initialization component 113 is provided below.

In some embodiments, as illustrated in FIG. 1A, the memory sub-system controller 115 includes at least a portion of the device initialization component 113. In some embodiments, the device initialization component 113 is part of the host system 120 (e.g., as an application, or an operating system running thereon). In some embodiments, local media controller 135 includes at least a portion of device initialization component 113 and is configured to perform the functionality described herein. In some embodiments, at least a portion of the device initialization component 113 may be part of an external system that is configured to perform the functionality described herein.

Figure 1B:
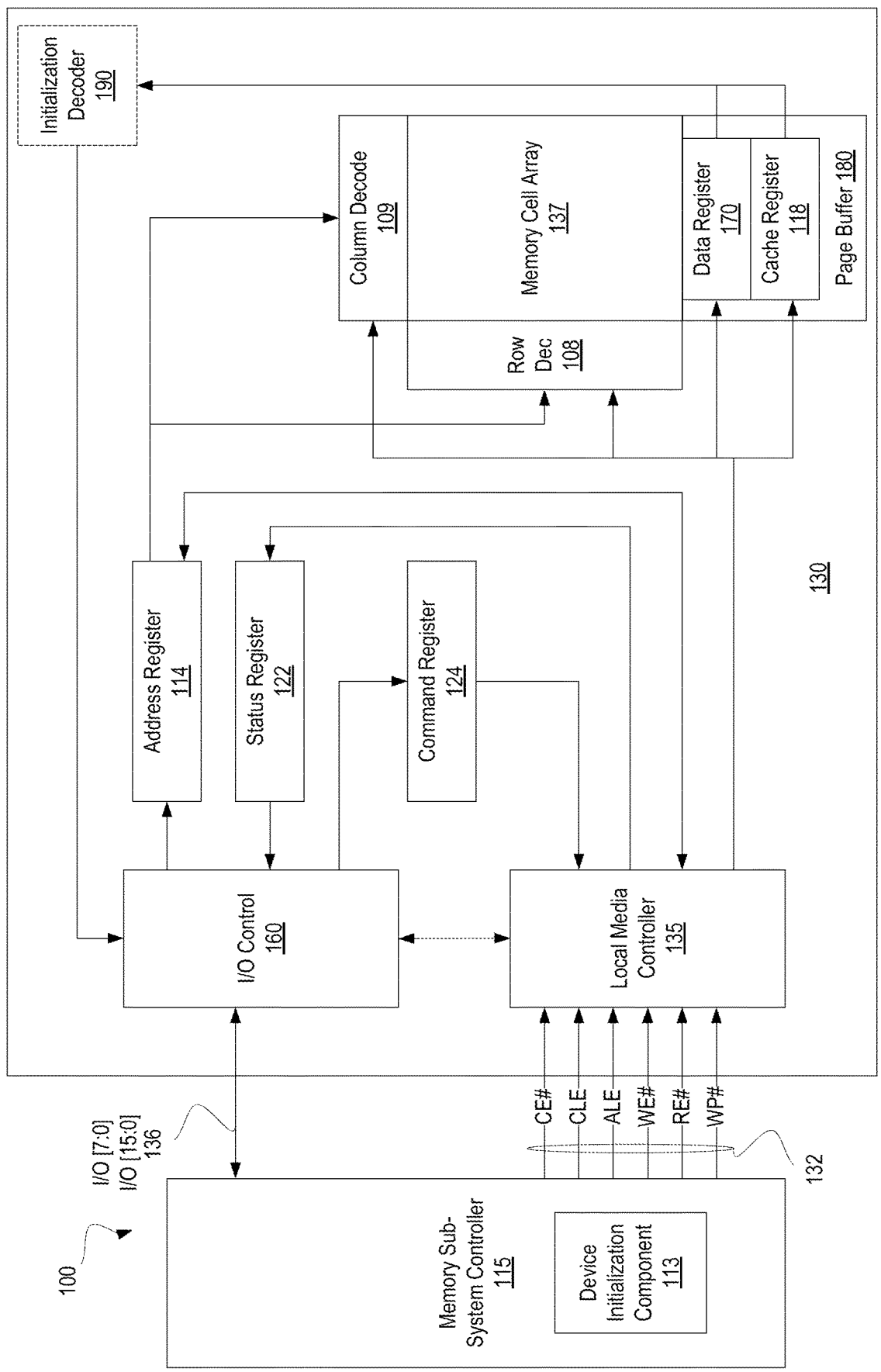
FIG. 1B illustrates a block diagram of a memory device in communication with a memory sub-system in accordance with some embodiments of the present disclosure.

FIG. 1B is a simplified block diagram of a computing system 100 including a first apparatus, in the form of a memory device 130, in communication with a second apparatus, in the form of a memory sub-system controller 115 of a memory sub-system (e.g., memory sub-system 110 of FIG. 1A) in accordance with some embodiments of the present disclosure.

Memory device 130 includes an array of memory cells 137 logically arranged in rows and columns. Memory cells of a logical row are typically connected to the same access line (e.g., a wordline) while memory cells of a logical column are selectively connected to the same conducting line (e.g., a bitline). A single access line may be associated with more than one logical row of memory cells and a single conducting line may be associated with more than one logical column. Memory cells (not shown in FIG. 1B) of at least a portion of array of memory cells 137 are capable of being programmed to one of at least two target data states.

Row decode circuitry 108 and column decode circuitry 109 are provided to decode address signals. Address signals are received and decoded to access the array of memory cells 137. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 137 in response to the commands and generates status information for the external memory sub-system controller 115. That is, the local media controller 135 is configured to perform access operations (e.g., read operations, write operations and/or erase operations) on the array of memory cells 137. The local media controller 135 is in communication with row decode circuitry 108 and column decode circuitry 109 to control the row decode circuitry 108 and column decode circuitry 109 in response to the addresses.

The local media controller 135 is also in communication with a page buffer 180 that is used to store data being sensed from, or written to, the array of memory cells 137. The page buffer 180 may include a data register 170, a cache register 118, and sense circuitry (not shown in FIG. 1B). The page buffer 180, for example, may include sense circuitry connected to one or more conducting lines (e.g., one or more bitlines) of the array of memory cells 137 that is configured to sense a change in voltage or current of the connected conducting lines (e.g., during a read operation). The voltage or current change that is sensed may be used to determine a binary value associated with a logical state of a selected memory cell connected to the conducting line. In some embodiments, the sense circuitry may be connected to each conducting line (e.g., each bitline) of the array of memory cells 137. In other embodiments, the sense circuitry may be selectively connected to a subset of conducting lines of the array of memory cells 137, for example, through a multiplexer. For instance, where a logical page of the array of memory cells 137 includes every other conducting line, the multiplexer might connect every other conducting line (e.g., even or odd bitlines) to the sense circuitry. The output of the sense circuitry (i.e., the determined binary values) may be provided to data register 170, which may be configured to store the data.

The data register 170 latches data, either incoming or outgoing, as directed by the local media controller 135, for example, to store data output by the sense circuitry during a read operation or store data to be written to the array of memory cells 137 as part of a write operation. Cache register 118 latches data, either incoming or outgoing, as directed by the local media controller 135, for example, to temporarily store data while the array of memory cells 137 is busy writing or reading, respectively, other data. During a program operation, data may be passed from the cache register 118 to the data register 170 to be written to the array of memory cells 137; then new data (e.g., received from memory sub-system controller 115 via I/O control circuitry 160) may be latched in the cache register 118. During a read operation, data may be passed from the cache register 118 to the I/O control circuitry 160 for output to the memory sub-system controller 115; then new data (e.g., sensed from memory cells 137) may be passed from the data register 170 to the cache register 118. A status register 122 may be in communication with I/O control circuitry 160 and the local memory controller 135 to latch the status information for output to the memory sub-system controller 115.

Figure 3A:
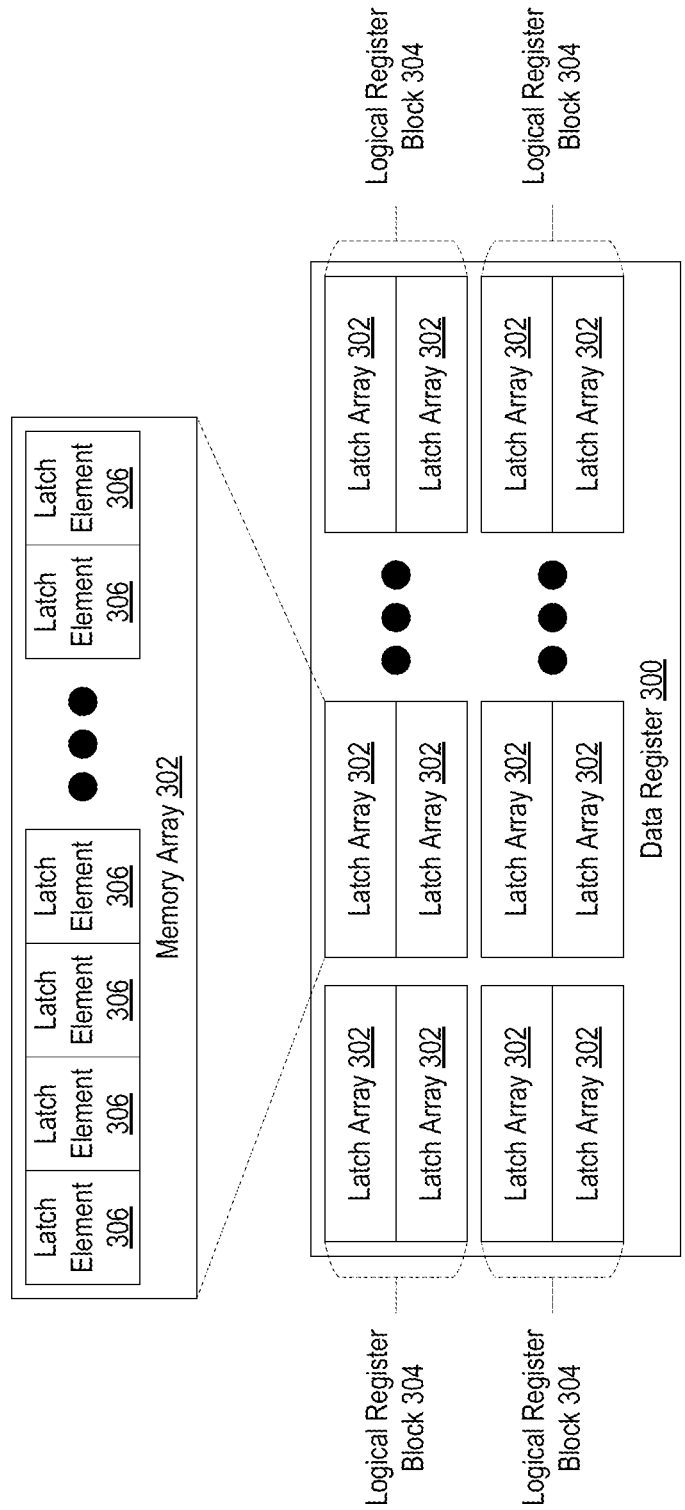
FIG. 3A illustrates a block diagram of a data register in accordance with some embodiments of the present disclosure.

A simplified block diagram of a data register (e.g., data register 170 or cache register 118 of FIG. 1B) in accordance with some embodiments of the present disclosure is provided in FIG. 3A. As illustrated, the data register 300 may include a number of latch arrays 302, which may be logically grouped into logical register blocks 304. Each latch array 302 may further include a number of latch elements 306 configured to store data (e.g., 8-bits or 16-bits of data). The latch element 306 may be considered the elemental unit of data that can be output from or stored to data register 300.

The data register 300 may be under the control of a controller (e.g., local media controller 135), which may direct the data register 300 to latch data into the latch elements 306. For example, as discussed above with reference to FIG. 1B, the data register 300 may be provided with the output of sense circuitry used to sense a binary value of selected memory cells in the array of memory cells 137 on conducting lines connected thereto (e.g., during a read operation). Each output of the sense circuitry (e.g., the binary value determined for each selected memory cell), may be provided to the data register 300, which may latch the data into latch elements 306.

The controller may also direct the data register 300 to selectively output data from latch elements 306. For example, as discussed above with reference to FIG. 1B, data may be passed from a data register (e.g., cache register 118) to I/O control circuitry (e.g., I/O control circuitry 160) for output to a memory sub-system controller (e.g., memory sub-system controller 115). The latch elements 306 of the data register 300, for instance, may be connected to sense circuitry (e.g., a sense amplifier) via one or more conducting lines, which may be configured to sense a change in voltage or current on the conducting lines when driven by latch elements 306 connected thereto. In some embodiments, for example, the latch elements 306 of a latch array 302 may be connected to a common conducting line, which may be connected to a sense amplifier configured to sense a change in voltage on the conducting line when driven by the latch elements 306 of the latch array 302. The voltage or current change that is sensed on a conducting line may be used to determine a data value (e.g., of a selected latch element 306 driving the conducting line), which may be output onto a data bus. In some embodiments, a multiplexer may combine the output sensed on multiple conducting lines (e.g., where each latch array 302 is connected to a separate conducting line), which may then be placed onto the data bus. In some embodiments, the output of the sense circuitry may be provided to a decoder (e.g., initialization decoder 190, described in further detail below), which may process the sensed data before it is provided to the multiplexer and/or placed onto the data bus.

Figure 3B:
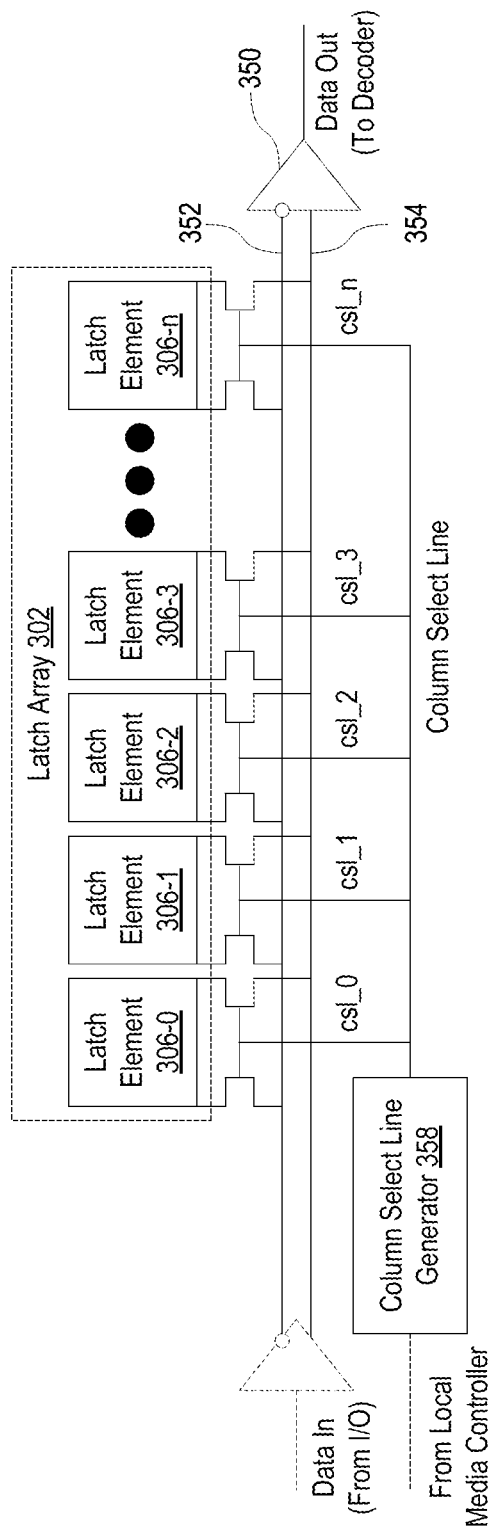
FIG. 3B illustrates a block diagram of a latch array and associated sensing circuitry in accordance with some embodiments of the present disclosure.

A simplified block diagram of a latch array and associated sensing circuitry that may be used to output data from the latch elements of the latch array in accordance with some embodiments of the present disclosure is provided in FIG. 3B. As illustrated, latch array 302 may include latch elements 306-0 to 306-$n$, which may be connected to a pair of differential lines 352, 354. The differential lines 352, 354, in turn, may be connected to a differential sense amplifier 350. The latch elements 306-0 to 306-$n$ may be selectively enabled via corresponding column select lines, i.e., csl_0 to csl_$n$. When enabled, a latch element 306 may drive a voltage onto differential lines 352, 354. The differential sense amplifier 350 may sense a voltage differential between the differential lines 352, 354 and may determine a data value based on the voltage differential sensed. The voltage differential, for instance, may be compared to one or more threshold criteria to determine the data value. As an illustrative example, if the voltage differential exceeds a minimum value (e.g., below which the sensed differential may be indistinguishable from noise) a binary data value of 0 or 1 may be determined, depending on the polarity of the voltage differential. The determined data value may be output by the differential sense amplifier 350, for example, to a decoder (e.g., initialization decoder 190), a multiplexer, or directly onto a data bus.

The column select line (CSL) signal generator 358, which may operate under the direction of a local media controller (e.g., local media controller 135 in FIGS. 1A-1B), may generate select signals on particular column select lines, i.e., csl_0 to csl_$n$, to enable particular latch elements 306-0 to 306-$n$ of the latch array 302. As noted above, in conventional memory sub-systems and/or memory devices, the CSL signal generator 358 is only capable of generating a select signal for a single column select line at a time. However, in embodiments of the present disclosure, the CSL signal generator 358 may be capable of generating multiple select signals simultaneously. In this way, multiple latch elements 306-0 to 306-$n$ may be concurrently selected to drive the differential lines 352, 354. This feature may be employed to perform a sense operation with error correction, e.g., during initialization of a computing system, as discussed in further detail below.

Returning to FIG. 1B, memory device 130 receives control signals from the memory sub-system controller 115 at the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 137.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

The local media controller 135 may be configured to perform different operations in response to control signals (e.g., command, address, and/or data signals) received from the external memory sub-system controller 115. The local media controller 135, for example, may be configured to perform different access operations (e.g., read operations, write operations and/or erase operations) on the array of memory cells 137 and/or output data or status information to memory sub-system controller 115 over the I/O bus 136. The local media controller 135 may generate and transmit control signals (e.g., command, data, or other control signals) to different components of the memory device 130 to affect such operations.

The local media controller 135, for example, may generate and transmit control signals to address register 114, row decode circuitry 108, column decode circuitry 109, page buffer 180, decoder 190, I/O control circuitry 160, and/or other components of memory device 130. Some components of memory device 130 may comprise one or more sub-components and/or circuitry elements, and in performing a particular operation, local media controller 135 may generate and transmit control signals to particular sub-components and/or circuitry elements of a component. For example, when performing an access operation, the local media controller 135 may generate and transmit control signals to different sub-components and/or circuitry elements within page buffer 180. The local media controller 135, for instance, may generate and transmit control signals to data register 170, cache register 118, and/or sense circuitry associated therewith.

It will be appreciated that performing a particular operation may involve generating and transmitting a number of control signals, to a number of different components, and/or in a particular sequence. It will further be appreciated that, in some cases, the control signals that are generated and transmitted by the local media controller 135 may cause one or more additional control signals to be generated or other signals to be produced by components of memory device 130 (and/or sub-components or circuitry elements thereof). By way of example, a read operation may involve a first sense operation, whereby data from a set of memory cells 137 (e.g., a page of memory cells 137) is placed into page buffer 180 (e.g., into data register 170 or cache register 118), and a second sense operation, whereby data from the page buffer 180 is output onto a data bus (e.g., I/O bus 136 via I/O control circuitry 160).

In performing the first sense operation, the local media controller 135 may generate and transmit control signals to address register 114, row decode circuitry 108, and/or column decode circuitry 109, to access the appropriate memory cells 137. The local media controller 135 may also generate and transmit control signals to page buffer 180, for example, to data register 170 and/or cache register 118 (e.g., to latch select circuitry thereof) to select the latch elements in which the data is to be stored (e.g., by generating enable signals on select lines thereof). Sense circuitry connected to the conducting lines of the memory cells 137 being accessed may sense a change in voltage or current on the conducting lines and determine a value of the data stored in those memory cells 137, which may then be stored in the selected latch elements.

The local media controller 135 may then perform the second sense operation. In so doing, the local media controller 135 may generate and transmit control signals to page buffer 180, for example, to data register 170 (e.g., to latch select circuitry thereof) to select the latch elements with the stored data (i.e., from the first sense operation), which may drive a conducting line when selected. Sense circuitry may sense a change in voltage or current on the conducting line and determine a value based thereon, which may then be output onto a data bus (e.g., as an output data signal).

In some cases, a read operation may be performed with default, non-optimized read parameters (e.g., during initialization of memory sub-system 110 and/or memory device 130), which may result in a non-trivial number of bit errors (i.e., in the first sense operation). In some embodiments, a read operation may be performed that provides for error correction through data redundancy. In some embodiments, for example, several copies of the same data (e.g., initialization data) may be stored in memory cells 137. As part of a first sense operation, multiple copies of the same data may be sensed into page buffer 180 from memory cells 137 (e.g., into latch elements of data register 170 or cache register 118), as discussed above.

In the second sense operation, latch elements containing sensed copies of the same data may be selected concurrently to drive a common conducting line, with each copy serving to reinforce a signal driven on the conducting line. In some embodiments, for example, the local media controller 135 may generate and transmit a control signal to page buffer 180, for example, to latch select circuitry thereof (e.g., to a column select line (CSL) signal generator thereof). The latch select circuitry, in turn, may generate enable signals (e.g., pulse signals) simultaneously on the select lines of latch elements containing copies of the same data. Sense circuitry may sense a change in voltage or current on the conducting line and determine a value based on the combined signal. In some embodiments, the sensed data may be output onto a data bus (e.g., as an output data signal). In other embodiments, the sensed data may be provided to a multiplexer and/or a decoder circuit (e.g., initialization decoder 190). In some embodiments, the decoder circuit may compare the output of several multi-copy read operations (i.e., performed on copies of the same data) to validate that the output data is correct (i.e., error free) and output the data onto a data bus (e.g., I/O bus 136 via I/O control circuitry 160). It will be appreciated that the above example(s) are merely illustrative and the local media controller 135 may generate and transmit additional, fewer, and/or alternative control signals, to additional, fewer, and/or alternative components (and/or sub-components or circuitry elements thereof), in a similar or different sequence to those described. In some embodiments, for example, local media controller 135 may generate and transmit control signals (e.g., enable signals) to enable the sense circuitry used in the first and/or second sense operation. As another example, the local media controller 135 may generate and transmit control signals (e.g., enable signals) to enable processing of output data from a second sense operation by a decoder circuit (e.g., during initialization of memory sub-system 110 and/or memory device 130) and/or may stop generating and transmitting such control signals to disable processing of the output data by the decoder circuit (e.g., after the memory sub-system 110 and/or memory device 130 has been initialized and optimized operation parameters have been retrieved). As yet another example, in some embodiments, the local media controller 135 may not need to generate and transmit control signals to page buffer 180 (e.g., to latch select circuitry thereof) in order to initiate the second sense operation. Instead, in some embodiments, the second sense operation may be performed automatically upon completion of the first sense operation, for example, with the latch select circuitry used to select the latch elements in the first sense operation (i.e., in which the sensed data is to be stored) also serving to select the latch elements in the second sense operation (i.e., from which the data is to be sensed).

As discussed with reference to FIG. 1A, the memory sub-system controller 115 can include a device initialization component 113 that can be used during initialization of the memory sub-system 110 and/or memory device 130, for example, to retrieve optimized operation parameters (or other data) from the memory device 130. The device initialization component 113, for instance, may be configured to retrieve the optimized operation parameters (along with other initialization data) from the array of memory cells 137 of memory device 130 where such data may be stored (e.g., in a read-only portion of the memory cells 137). Since optimized parameters are not available at initialization, the read operation may be performed using default read operation parameters, which may be provided by dedicated logic (e.g., hard-coded circuitry) of the memory sub-system 110 and/or memory device 130. Since a read operation performed with these default parameters is expected to produce a non-trivial number of bit errors, additional measures may be taken to ensure that the read operation is free of data errors.

The device initialization component 113, for example, may employ data redundancy and utilize a sense operation with error correction to ensure a fault-tolerant read operation. In some embodiments, for instance, multiple copies of data (e.g., initialization data) may be stored in the array of memory cells 137 of the memory device 130. In some cases, one or more of the copies may be stored in bit-inverted form, which may provide for a more robust error detection mechanism (e.g., on account of an asymmetric error rate experienced by stored 0's and stored 1's). Illustratively, k copies of data may be redundantly stored in the array of memory cells 137. Of the k copies, half may be stored normally, while the other half may be stored in bit-inverted form.

The manner in which the copies are stored in the array of memory cells 137 may vary. In some embodiments, for example, the normal copies may be sequentially stored in the array of memory cells 137, followed by the bit-inverted copies. While in other embodiments, the normal and bit-inverted copies may be alternatively stored in the array of memory cells 137. In yet other embodiments, the copies may be interleaved with each other, for example, storing the same portion of the data together (e.g., k copies of a first byte, followed by k copies of a second byte, and so on). It will be appreciated that other orderings are also possible. In some embodiments, for example, the copies may be stored in such a way that the same portions of the data, when sensed and latched into a data register (e.g., data register 170 and/or cache register 118), are placed into latch elements connected to a common conducting line such that they can be concurrently selected during a second sense operation.

As part of the initialization read operation, a first sensing operation may be performed whereby multiple copies of the same data (e.g., multiple copies of the initialization data, or a portion thereof) may be obtained from the array of memory cells 137 and placed into data register 170. The copies may then be passed from the data register 170 to cache register 118. The data may then be output from the cache register 118 onto a data bus as part of a second sensing operation. In some embodiments, the cache register 118 may be omitted, and the data may be output from data register 170 onto a data bus as part of a second sensing operation. In order to ensure that the initialization read operation is error free, a sense operation with error correction may be employed for the second sense operation. In this sense operation, multiple latch elements, each containing sensed copies of the same data (e.g., sensed copies of an $n^{th}$ byte of the initialization data obtained through a first sense operation), are selected such that they collectively drive a common conducting line connected to the cache register 118 on which an output data is sensed, with each copy serving to reinforce a signal driven on the conducting line. To the extent that an error is present with respect to a particular copy, the signal driven by the other copies is able to compensate for the error, allowing for the correct data to be sensed on the conducting line.

For instance, with reference to FIG. 3A, data register 300 may contain data that may have been obtained from an array of memory cells (e.g., the array of memory cells 137) as part of a first sense operation. The data register 300, for example, may contain k sensed copies of a data of N bytes (e.g., half in normal and half in bit-inverted form), with each byte of the kN bytes being stored in a latch element 306. Multiple latch elements 306 containing the same data, e.g., an $n^{th}$ byte of the data, may be selected to concurrently drive a common conducting line. The combined signal may be provided to sense circuitry connected to the conducting line, which may determine an output data value based on the combined signal.

For example, with reference to FIG. 3B, latch elements 306-0, 306-1, 306-2, and 306-3 may each contain a sensed copy of a particular byte of data. The CSL signal generator 358, under the direction of a local communication controller (e.g., local communication controller 135), may generate a select signal on respective column select lines, i.e., csl_0, csl_1, csl_2, and csl_3, to enable the latch elements. When enabled, latch elements 306-0, 306-1, 306-2, and 306-3 may drive differential lines 352, 354. The combined signal may be provided to differential sense amplifier 350, which may sense a voltage differential (i.e., between the differential lines 352, 354) and determine an output data value based on the sensed voltage differential. To the extent that a bit error may occur with respect to one of the copies (e.g., provided by latch element 306-1), the signal driven by the other copies (if error free) may compensate for the error, allowing the differential sense amplifier 350 to nevertheless determine a correct output data value (i.e., of the particular byte of data). In this way, error correction may be performed as part of the sensing operation itself.

Figure 3C:
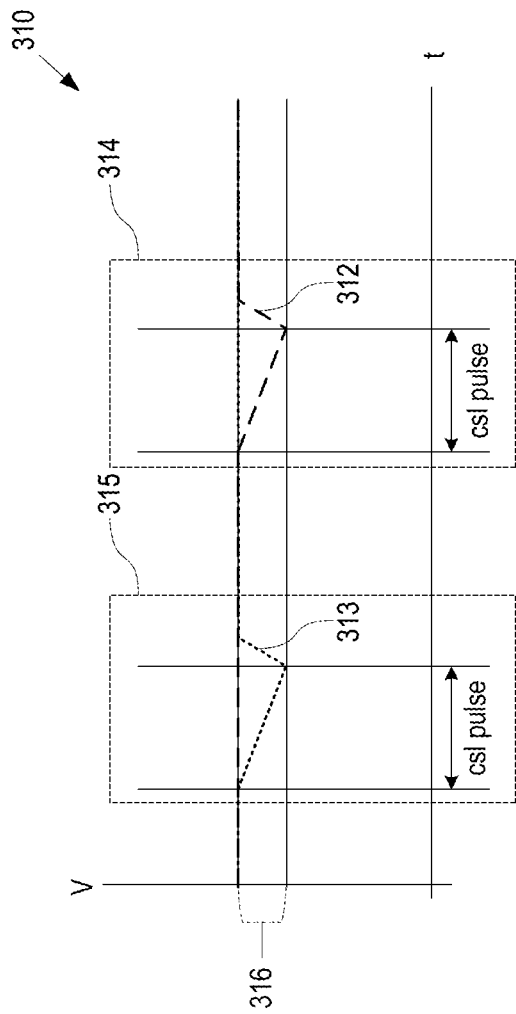
FIG. 3C illustrates a chart of the voltage that may be driven on a conducting line when a single latch element is enabled in accordance with some embodiments of the present disclosure.
Figure 3D:
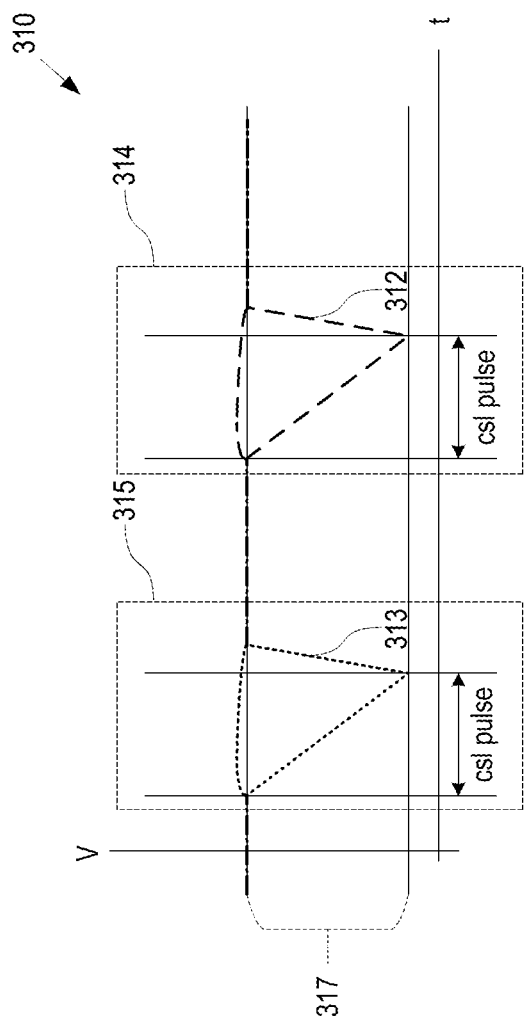
FIG. 3D illustrates a chart of the voltage that may be driven on a conducting line when multiple latch elements are enabled in accordance with some embodiments of the present disclosure.
Figure 3E:
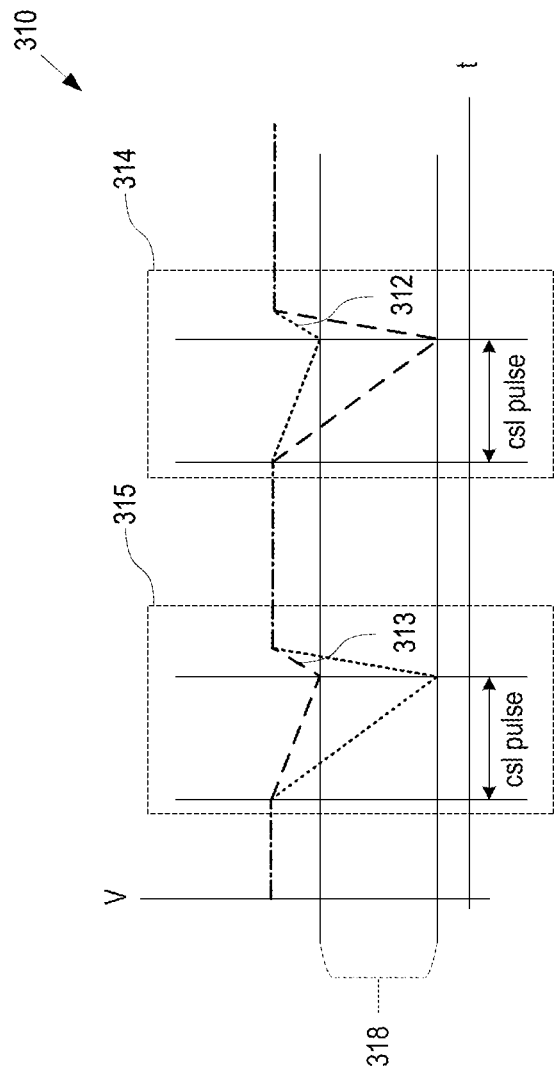
FIG. 3E illustrates a chart of the voltage that may be driven on a conducting line when multiple latch elements are enabled, but where an error is present, in accordance with some embodiments of the present disclosure.

FIGS. 3C-3E are charts illustrating the voltages that may be driven on a pair of differential lines. In each chart 310, the vertical axis represents a voltage driven and the horizontal axis represents time, with voltage on a pair of differential lines (e.g., differential lines 352, 354) plotted as lines 312, 313, respectively. FIG. 3C, for example, is a chart illustrating the voltage that may be driven on the differential lines when a single latch element is enabled. As shown in region 314, when a latch element having a bit value of 0 is selected (e.g., by generating a pulse on a corresponding column select line), a voltage change is produced on conducting line 352 while conducting line 354 remains unchanged. A resulting differential voltage 316 is available to be sensed by the differential sense amplifier 350. Similarly, as shown in region 315, when a latch element having a bit value of 1 is selected, a voltage change is produced on conducting line 354 while conducting line 352 remains unchanged. The same differential voltage 316 (but with opposite polarity) is available to be sensed by the differential sense amplifier 350.

FIG. 3D is a chart illustrating the voltage that may be driven on the differential lines when multiple latch elements are simultaneously enabled. As shown in region 314, when multiple latch elements having a bit value of 0 are concurrently selected, a voltage change is produced on conducting line 352 while conducting line 354 remains unchanged. A resulting differential voltage 317 is available to be sensed by the differential sense amplifier 350. Similarly, as shown in region 315, when multiple latch elements having a bit value of 1 are concurrently selected, a voltage change is produced on conducting line 354 while conducting line 352 remains unchanged. The same differential voltage 317 (but with opposite polarity) is available to be sensed by the differential sense amplifier 350. The differential voltage 317 available to the differential sense amplifier 350 is a multiple of that produced by a single latch element (e.g., of differential voltage 316 in FIG. 3C), with the multiplicity factor depending on the number of latch elements concurrently selected.

FIG. 3E is a chart illustrating the voltage that may be driven on the differential lines when multiple latch elements are simultaneously enabled, but where there is an error in one of the latch elements. As shown in region 314, multiple latch elements having a bit value of 0 may produce a voltage change on conducting line 352, while a latch element having an incorrect bit value of 1 may produce a voltage change on conducting line 354, leaving a differential voltage 318 available to be sensed by the differential sense amplifier 350. Similarly, as shown in region 315, multiple latch elements having a bit value of 1 may produce a voltage change on conducting line 352, while a latch element having an incorrect bit value of 0 may produce a voltage change on conducting line 354, leaving the same differential voltage 318 (but with opposite polarity) available to be sensed by the differential sense amplifier 350. While the bit error in the latch element reduces the available differential voltage 318 (e.g., relative to the differential voltage 307 in FIG. 3D), the differential voltage 318 is sufficient for sense amplifier 350 to determine the correct output data value. The differential voltage 318, moreover, may be larger than that produced by a single latch element (e.g., differential voltage 316 in FIG. 3C). This may allow the differential sense amplifier 350 to perform the sensing more quickly and/or accurately.

Returning to FIG. 1B, in some embodiments, additional measures may be taken to further ensure a fault tolerant read operation. For example, while the above-described sensing operation provides for error correction as part of the sensing operation itself, it does so through a majority vote-like scheme. However, there may be instances where multiple errors are present, such that an incorrect result may be produced (e.g., where a majority of the copies contain an error) or an adequate voltage differential is not available for a reliable determination to be made by the sensing circuitry (e.g., where an equal number of copies contain an error and are error free). Therefore, in some embodiments, additional copies of the data may be used to ensure that the read operation is error free. For example, several multi-copy sensing operations may be performed (i.e., on copies of the same data), the results of which may be provided to initialization decoder 190 for comparison. Based on the comparison, the initialization decoder 190 may select an output data value to place on the data bus (e.g., for receipt by I/O control circuitry 160).

For instance, a first multi-copy sensing operation may be performed on a first subset of k sensed copies of the same data (i.e., obtained through a first sense operation), and a second multi-copy sensing operation may be performed on a second subset of the k sensed copies of the same data. In some embodiments, the second subset of sensed copies may be those stored in bit-inverted form, which may provide for a more robust error detection mechanism. The resulting data values may be provided to the initialization decoder 190, which may compare the first output data value with the second output data value to validate whether the first output data value is correct. For example, where the first and second output data values are produced using normal copies of the same data, the decoder may pass the data values through an AND gate to ensure that they are the same. Alternatively, where the first output data value is produced from normal copies of the same data and the second output data value is produced from bit-inverted copies of the same data, the decoder may pass the first and second data values through an XOR gate. To the extent that the first and second values are incongruent with one another, another data value resulting from another multi-copy sensing operation (e.g., performed on a third subset of the k copies of the same data) may be considered. This other data value may also be subject to validation by the initialization decoder 190, for example, through comparison with the results of yet another multi-copy sensing operation (e.g., performed on a fourth subset of the k copies of the same data). Additional data values may be considered and verified as necessary, i.e., until each of the k copies have been processed.

Figure 4A:
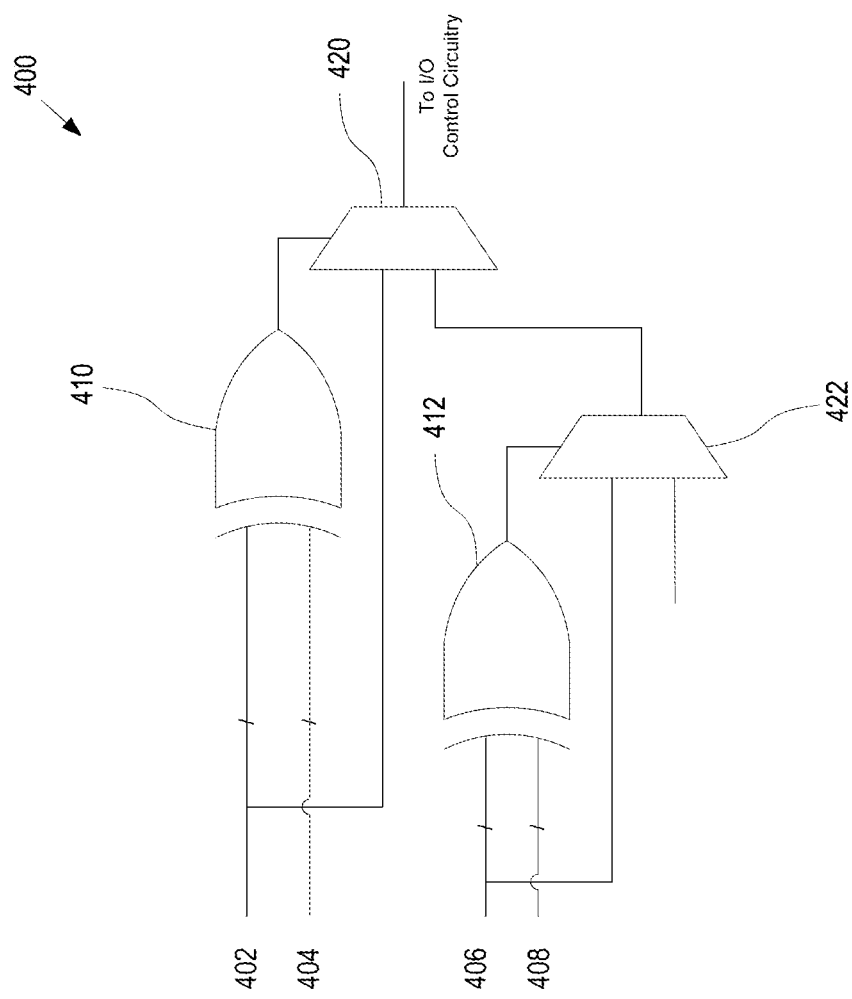
FIG. 4A illustrates a circuit diagram of an example of a decoder circuit in accordance with some embodiments of the present disclosure.

FIG. 4A is a circuit diagram of an illustrative example of a decoder circuit (e.g., initialization decoder 190 of FIG. 1B) in accordance with some embodiments of the present disclosure. The decoder circuit 400 may be used to ensure a fault tolerant read operation using k sensed copies of data (e.g., sixteen sensed copies of the initialization data), half of which may be in normal form and half of which may be in bit-inverted form. As illustrated, the decoder circuit 400 may be provided with four inputs 402, 404, 406, 408, each of which may be the result of a separate multi-copy sensing operation. Inputs 402 and 406, for example, may be the result of a multi-copy sensing operation each performed on k/4 sensed copies of the data (e.g., by concurrently selecting four latch elements containing sensed copies of the $n^{th}$ byte of the initialization data). Inputs 404 and 408, likewise, may be the result of a multi-copy sensing operation performed on k/4 sensed bit-inverted copies of the data (e.g., by selecting k/4 latch elements containing sensed bit-inverted copies of the $n^{th}$ byte of the initialization data).

The decoder circuit 400 may operate to perform a prioritized selection between inputs 402 and 404, subject to validation by inputs 406 and 408, respectively. As illustrated, for example, inputs 402 and 404 may be passed through an XOR gate 410, which may operate to validate whether the input 402 is a correct data value (e.g., for the $n^{th}$ byte of the initialization data). The output of the XOR gate 410 may be provided as the select signal to a multiplexer 420 to choose between multiplexer inputs. The first input to the multiplexer 420 may be the input 402. When the inputs 402 and 404 are congruent with one another, a determination may be made that the input 402 contains a correct data value and the XOR gate 410 may cause multiplexer 420 to select input 402 for output. If the inputs 402 and 404 are incongruent with one another, the XOR gate 410 may cause multiplexer 420 to pass through the output of multiplexer 422, e.g., which may be the alternative data value provided by input 406 (if successfully verified by input 408) as discussed below.

More particularly, inputs 406 and 408 may be passed through an XOR gate 412, which may operate to validate whether the input 406 is a correct data value (e.g., for the $n^{th}$ byte of the initialization data). The output of XOR gate 410 may be provided as the select signal to multiplexer 422 to choose between two multiplexer inputs. The first input to the multiplexer 422 may be the input 406. When the inputs 406 and 408 are congruent with one another, a determination may be made that the input 406 contains a correct data value and the XOR gate 412 may cause multiplexer 422 to select input 406 for output. If the inputs 406 and 408 are incongruent with one another, the XOR gate 410 may cause multiplexer 420 to select the other input of multiplexer 422, which may be a null input. It will be appreciated that similar circuitry (e.g., additional XOR gates and multiplexers) may be provided in cascaded fashion (e.g., with the output of similar circuitry being provided as an input to multiplexer 422) to allow for consideration of and prioritized selection between additional data values (e.g., resulting from multi-copy sensing operations performed on additional sensed copies of the initialization data).

Figure 4B:
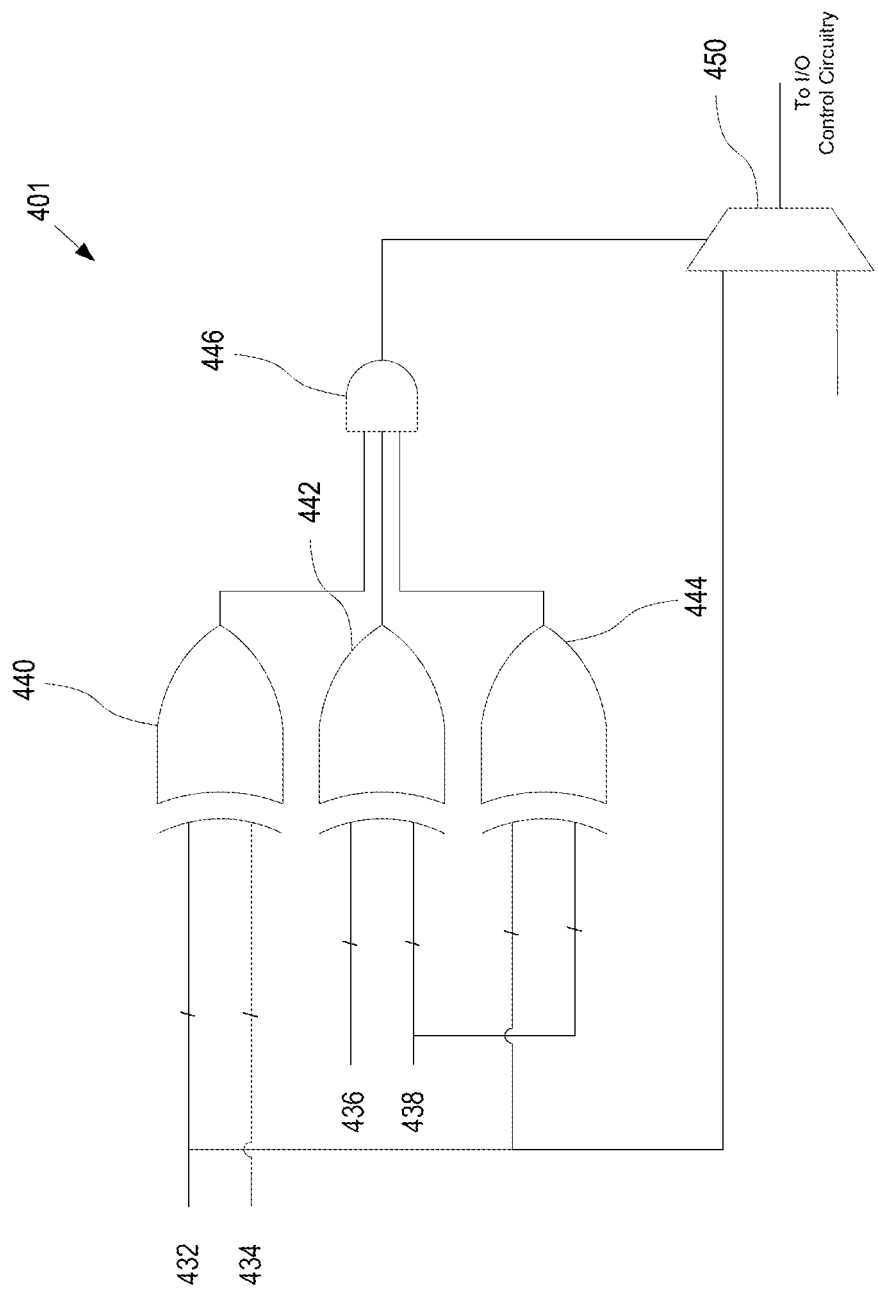
FIG. 4B illustrates a circuit diagram of another example of a decoder circuit in accordance with some embodiments of the present disclosure.

FIG. 4B is a circuit diagram of another illustrative example of a decoder circuit (e.g., initialization decoder 190 of FIG. 1B) in accordance with some embodiments of the present disclosure. The decoder circuit 401 may be used to ensure a fault tolerant read operation using k sensed copies of data (e.g., sixteen sensed copies of the initialization data), half of which may be in normal form and half of which may be in bit-inverted form. As illustrated, the decoder circuit 401 may be provided with four inputs 432, 434, 436, 438, each of which may be the result of a separate multi-copy sensing operation. Inputs 432 and 436, for example, may be the result of a multi-copy sensing operation each performed on k/4 sensed copies of the data (e.g., by concurrently selecting four latch elements containing sensed copies of the $n^{th}$ byte of the initialization data). Inputs 434 and 438, likewise, may be the result of a multi-copy sensing operation performed on k/4 sensed bit-inverted copies of the data (e.g., by selecting k/4 latch elements containing sensed bit-inverted copies of the $n^{th}$ byte of the initialization data).

The decoder circuit 401 may operate perform a prioritized selection of input 432, subject to cross-validation of inputs 432 and 436 by inputs 434 and/or 438. The validation process performed by decoder circuit 401 may provide more robust error detection than that of decoder circuit 400 of FIG. 4A. For instance, it could be the case that two inputs, e.g., inputs 432 and 434, contain reciprocal errors (e.g., in the same bit position) such that the inputs would appear to be congruent with each other (e.g., when passed through an XOR gate). This could lead decoder circuit 400 to incorrectly determine that an input, e.g., input 432, contains a correct data value, when it, in fact, does not. By cross-validating inputs 432 and 436 against inputs 434 and/or 438, decoder circuit 401 may be able to detect such errors and may be able to consider and/or select an alternative data value instead.

As illustrated in FIG. 4B, for example, inputs 432 and 434 may be passed through an XOR gate 440, which may operate to validate whether the input 402 is a correct data value (e.g., for the $n^{th}$ byte of the initialization data). Inputs 436 and 438, likewise, may be passed through an XOR gate 442, which may operate to validate whether the input 436 is a correct data value (e.g., for the $n^{th}$ byte of the initialization data). Input 432 may also be passed through an XOR gate 444 with input 438, which may operate to further validate whether the input 402 is a correct data value (e.g., for the $n^{th}$ byte of the initialization data). The output of XOR gates 440, 442, 444 may be provided to an AND gate 446, the output of which may be provided as the select signal to a multiplexer 450 to choose between multiplexer inputs. The first input to the multiplexer 450 may be the input 432. If input 432 is congruent with inputs 434 and 438 and input 436 is congruent with input 438, a determination may be made that the input 432 contains a correct data value and the AND gate 446 may cause multiplexer 450 to select input 432 for output. If input 432 is incongruent with either input 434 or input 438 or input 436 is incongruent with input 438, a determination may be made that the input 432 may contain an error and the AND gate 446 may cause multiplexer 450 to select the other input of multiplexer 450, which may be a null input. It will be appreciated that similar circuitry (e.g., additional XOR gates, AND gates, and multiplexers) may be provided in cascaded fashion (e.g., with the output of similar circuitry being provided as an input to multiplexer 450) to allow for consideration of and selection between additional data values (e.g., resulting from multi-copy sensing operations performed on additional sensed copies of the initialization data).

Returning to FIGS. 1A-1B, it will be appreciated by those skilled in the art that additional circuitry and signals can be provided and that the memory device 130 of FIGS. 1A-1B has been simplified. It should also be recognized that the functionality of the various block components described with reference to FIGS. 1A-1B need not be segregated to distinct components or component portions of an integrated circuit device. For example, a single component or component portion of an integrated circuit device could be adapted to perform the functionality of more than one block component of FIGS. 1A-1B. Similarly, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
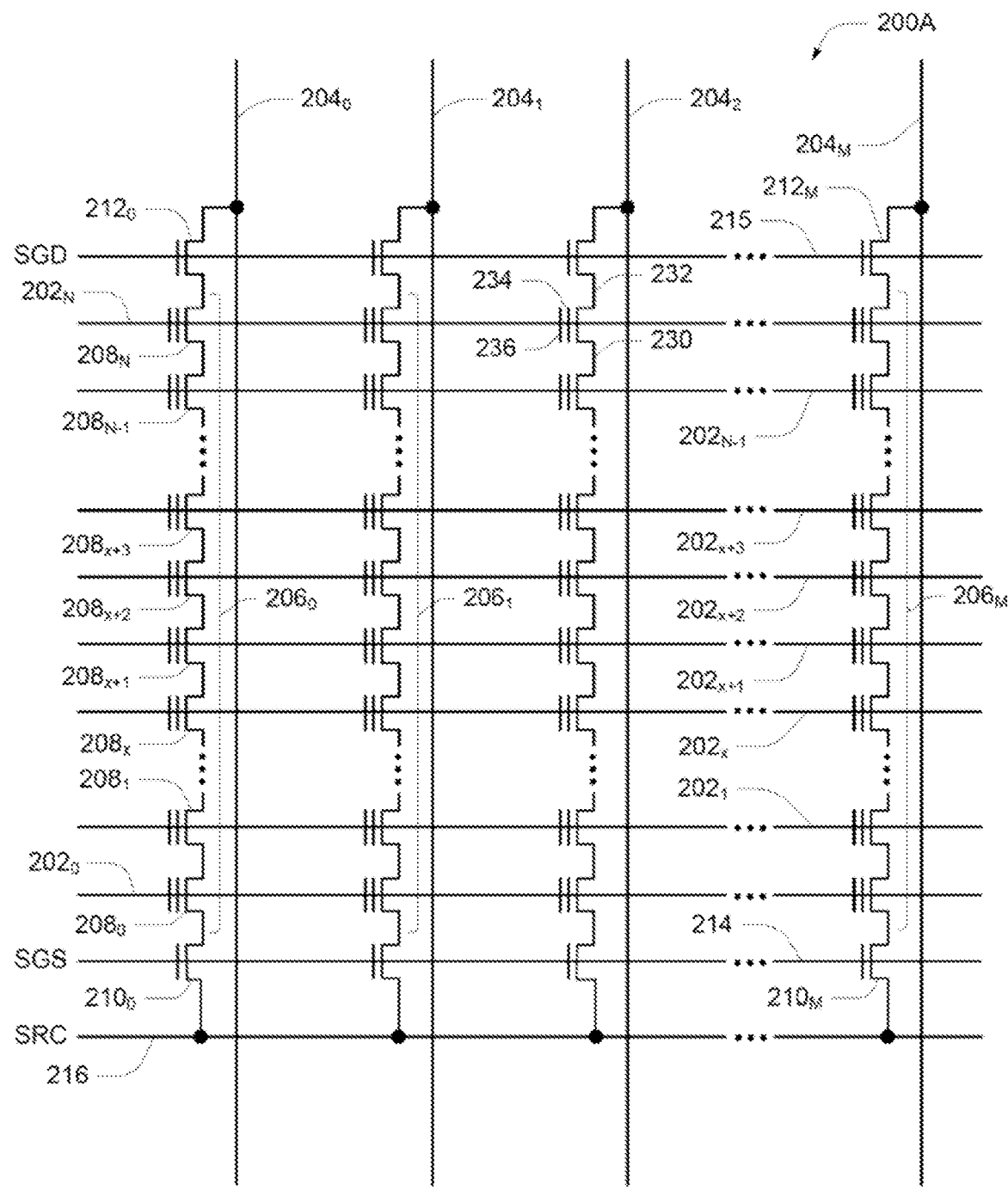
FIG. 2A illustrates a portion of an example array of memory cells that can be included in a memory device in accordance with some embodiments of the present disclosure.

FIG. 2A illustrates a portion of an array of memory cells 200A that could be included in a memory device (e.g., as a portion of memory cells 137) in accordance with some embodiments of the present disclosure. Memory array 200A includes access lines, such as word lines $202_0$ to $202_N$, and conducting lines, such as bitlines $204_0$ to $204_M$. The word lines 202 can be connected to global access lines (e.g., global word lines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a word line 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206. For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 can have their control gates 236 connected to (and in some cases can form) a word line 202.

A column of the memory cells 208 can be a NAND string 206 or a number of NAND strings 206 selectively connected to a given bitline 204. A row of the memory cells 208 can be memory cells 208 commonly connected to a given word line 202. A row of memory cells 208 can, but need not, include all the memory cells 208 commonly connected to a given word line 202. Rows of the memory cells 208 can be divided into one or more groups of physical pages of memory cells 208. Physical pages of the memory cells 208 can include every other memory cell 208 commonly connected to a given word line 202. For example, the memory cells 208 commonly connected to word line $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to word line $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given word line 202 can also define a physical page of memory cells 208. For certain memory devices, all memory cells commonly connected to a given word line can be deemed a physical page of memory cells. The portion of a physical page of memory cells (which, in some embodiments, could still be the entire row) that is read during a single read operation or programmed during a single write operation (e.g., an upper or lower page of memory cells) can be deemed a logical page of memory cells. A block of memory cells can include those memory cells that are configured to be erased together, such as all memory cells connected to word lines $202_0$-$202_N$ (e.g., all NAND strings 206 sharing common word lines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 2B:
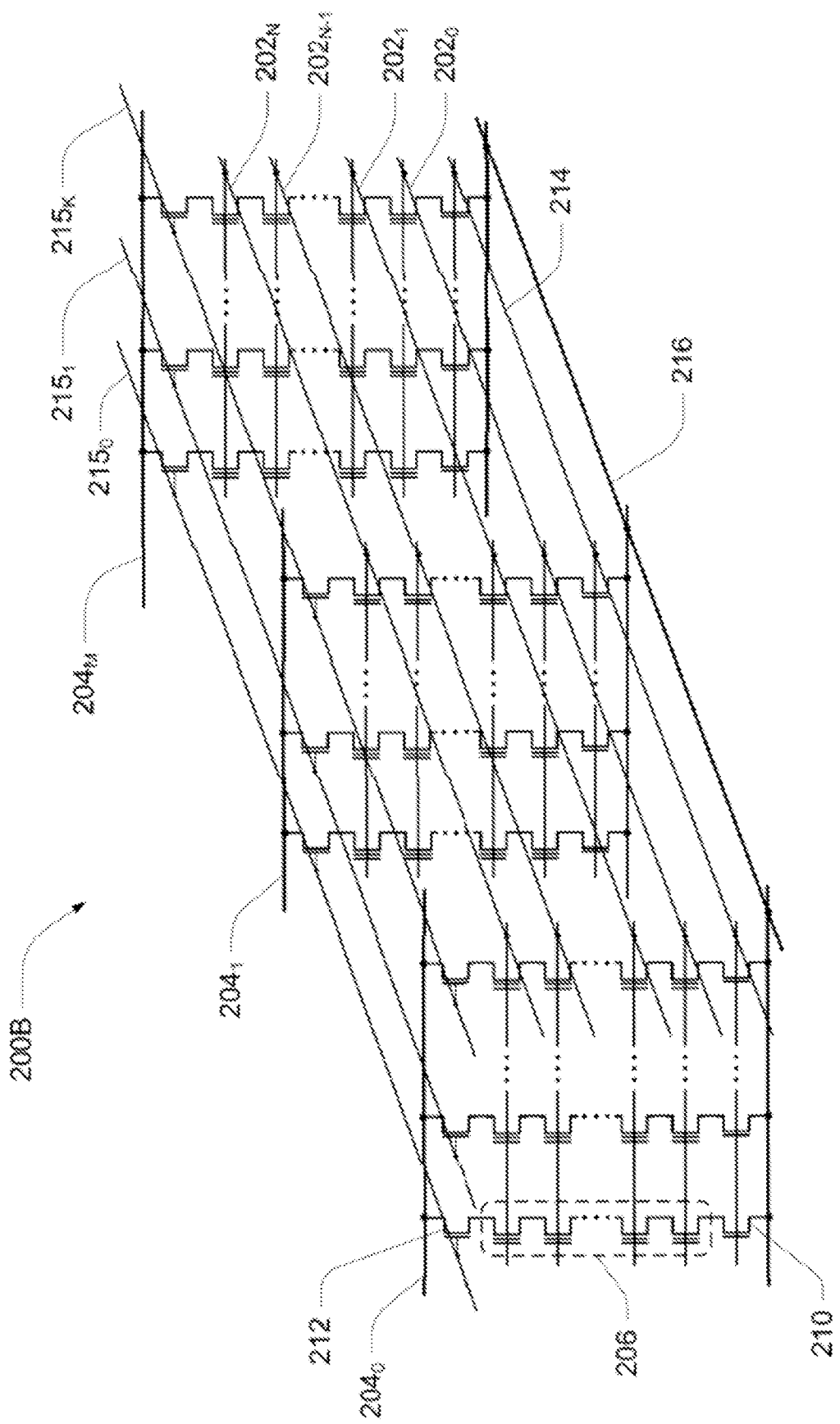
FIG. 2B illustrates a portion of another example array of memory cells that can be included in a memory device in accordance with some embodiments of the present disclosure.

FIG. 2B illustrates a portion of another array of memory cells 200B that could be included in a memory device (e.g., as a portion of memory cells 137) in accordance with some embodiments of the present disclosure. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. Each word line 202 can be connected to multiple rows of memory cells of the memory array 200B. Rows of memory cells that are commonly connected to each other by a particular word line 202 can collectively be referred to as tiers.

Figure 2C:
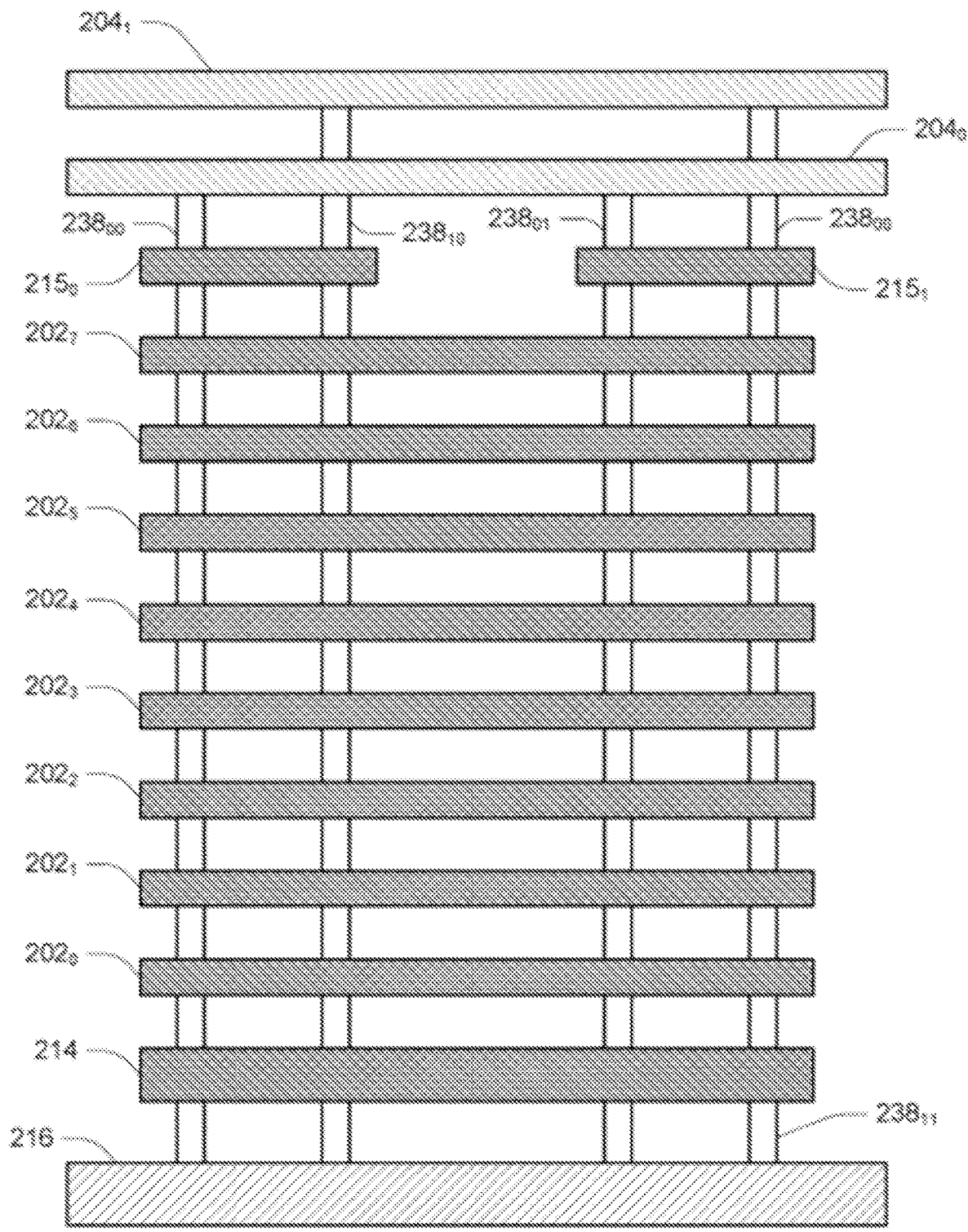
FIG. 2C illustrates a portion of yet another example array of memory cells that can be included in a memory device in accordance with some embodiments of the present disclosure.

FIG. 2C illustrates a portion of yet another array of memory cells 200C that could be included in a memory device (e.g., as a portion of memory cells 137) in accordance with some embodiments of the present disclosure. Like numbered elements in FIG. 2C correspond to the description as provided with respect to FIG. 2A. Channel regions (e.g., semiconductor pillars) $238_{00}$ and $238_{01}$ represent the channel regions of different strings of series-connected memory cells (e.g., NAND strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a NAND string 206 of FIGS. 2A-2B). Additional features might be common in such structures, such as dummy wordlines, segmented channel regions with interposed conductive regions, etc.

Figure 5:
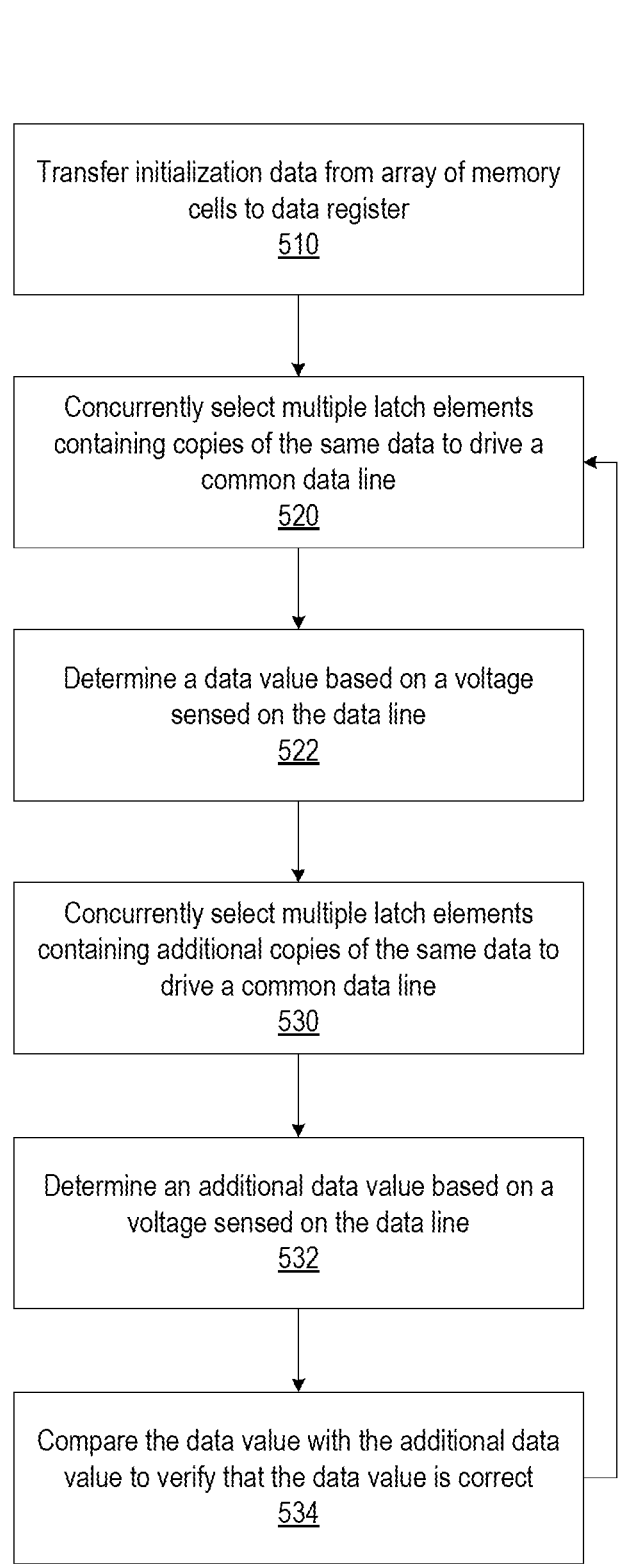
FIG. 5 is a flow diagram of an example method for performing an initialization read operation to retrieve data from a memory device in accordance with some embodiments of the present disclosure

FIG. 5 is a flow diagram of an example method 500 for performing an initialization read operation to retrieve data from a memory device in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory sub-system controller 115 of FIG. 1 (e.g., using device initialization component 113 thereof). In some embodiments, the method 500 is performed by the local media controller 135 of FIG. 1 (e.g., using a device initialization component thereof). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic may perform a first sensing operation using default operation parameters, whereby multiple copies of the same stored data may be obtained from an array of memory cells in a memory device and placed into a plurality of latch elements in a page buffer connected thereto. In some embodiments, for example, the processing logic may generate one or more first control signals to cause sense circuitry to sense multiple copies of the stored data from a subset of memory cells of the array of memory cells into a plurality of latch elements in a page buffer. The array of memory cells, for example, may contain k copies of an initialization data of N bytes, some of which may be stored in bit-inverted form. In performing the first sensing operation, the processing logic may place each of the kN bytes of initialization data that are sensed into a corresponding latch element of a data register in the page buffer. In some embodiments, the processing logic may transfer the sensed initialization data from the data register to a cache register of the memory device.

The processing logic may perform a second sensing operation using default operation parameters, whereby the sensed data in the data register (or cache register) is used to obtain error free output data (i.e., an error free version of the stored data) and place it onto a data bus. In order to ensure an error free output, the processing logic may employ a sensing operation with error correction, whereby multiple copies of the same portion of the sensed data in the data register (or cache register) are considered simultaneously.

At operation 520, the processing logic may select multiple latch elements containing sensed copies of the same portion of the stored data (e.g., sensed copies of an $n^{th}$ byte of the initialization data) by enabling a respective select line of each latch element. In some embodiments, for example, the processing logic may generate one or more second control signals to cause select circuitry to select two or more latch elements by enabling respective select lines of each of the two or more latch elements. In some embodiments, the one or more second control signals may be distinct from the one or more first control signals, while in other embodiments, they may overlap or be coextensive with each other. The processing logic, for example, may direct a CSL signal generator to simultaneously generate a select signal (e.g., a pulse signal) on respective column select lines of the desired latch elements. When enabled, the latch elements may concurrently drive a common conducting line, with the combined signal being provided to sense circuitry connected to the conducting line.

At operation 522, the sense circuitry may sense a voltage on the conducting line based on which an output data value may be determined. In some embodiments, for example, the conducting line may include a pair of differential lines and the sense circuitry may include a differential sense amplifier configured to sense a voltage differential between the differential lines. The processing logic and/or differential sense amplifier may operate to compare the voltage differential to one or more threshold criteria to determine the data value. For example, if the voltage differential exceeds a minimum value (e.g., below which the signal may not be distinguishable from noise on the conducting line) a binary data value of 0 or 1 may be determined, depending on the polarity of the voltage differential.

In some embodiments, the processing logic may validate whether the output data value is a correct data value, for example, by comparing the output data value to an additional data value obtained by performing a sensing operation on multiple additional copies. For example, at operation 530, the processing logic may select multiple additional latch elements containing sensed copies of the same portion of the stored data (e.g., sensed copies of an $n^{th}$ byte of the initialization data) by enabling a respective select line of each latch element. In some embodiments, for example, the processing logic may generate one or more third control signals to cause select circuitry to select two or more additional latch elements by enabling a respective select line of each of the two or more additional latch elements. In some embodiments, the one or more third control signals may be distinct from the one or more first and/or second control signals, while in other embodiments, they may overlap or be coextensive with each other. The processing logic, for example, may direct a CSL signal generator to simultaneously generate a select signal (e.g., a pulse signal) on respective column select lines of the desired latch elements. When enabled, the latch elements may concurrently drive a common conducting line, with the combined signal being provided to sense circuitry connected to the conducting line. In some embodiments, the multiple additional latch elements may contain sensed bit-inverted copies of the same portion of the stored data, which may provide for a more robust error detection mechanism.

At operation 532, the sense circuitry may sense a voltage on the conducting line based on which an additional output data value may be determined. In some embodiments, for example, the conducting line may include a pair of differential lines and the sense circuitry may include a differential sense amplifier configured to sense a voltage differential between the differential lines. The processing logic and/or differential sense amplifier may operate to compare the voltage differential to one or more threshold criteria to determine the data value.

At operation 534, the output data value and additional output data value may be compared to validate that the output data value is correct (e.g., the $n^{th}$ byte of the initialization data). The output data value and additional output data value, for example, may be passed through a logic gate, e.g., an AND gate or an XOR gate, depending on whether the additional data value was obtained using normal or bit-inverted copies of the data. If the output data value is correct, it may be selected to be output onto a data bus. To the extent that the first and second output data values are incongruent with one another, another output data value may be considered, which may result from another sensing operation performed using multiple additional sensed copies of the same portion of the stored data. This another output data value may also be subject to validation, for example, through a comparison with yet another output data value resulting from a sensing operation performed using multiple additional sensed copies of the same portion of the stored data.

The second sense operations described above (i.e., operations 520-534) may be repeated until all desired portions of the stored data (e.g., each of bytes 1 to N of the initialization data) have been obtained and placed onto the data bus.

Figure 6:
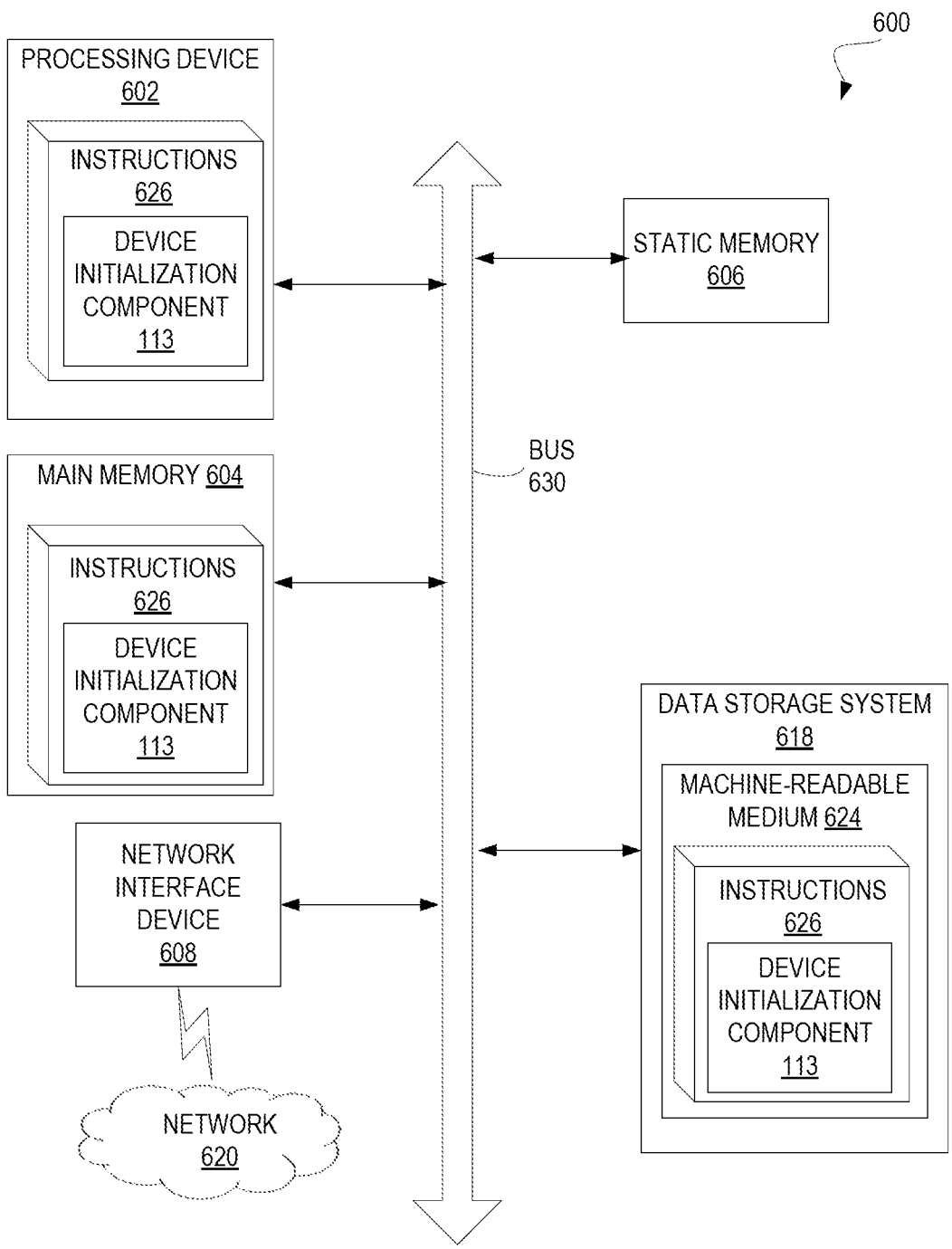
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the device initialization component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1A.

In one embodiment, the instructions 626 include instructions to implement functionality corresponding to a device initialization component (e.g., the device initialization component 113 of FIG. 1A). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    an array of memory cells;
    a page buffer coupled to the array of memory cells, the page buffer comprising a plurality of latch elements;
    a conducting line coupled to the plurality of latch elements; and
    a processing device, operatively coupled with the array of memory cells and page buffer, to perform operations comprising:
        generating one or more first control signals to cause sense circuitry to sense multiple copies of a stored data from a subset of memory cells of the array of memory cells into the plurality of latch elements; and
        generating one or more second control signals to cause select circuitry to select two or more latch elements by enabling a respective select line of each of the two or more latch elements,
        wherein an output data is determined based on a sensing of the conducting line driven by the two or more latch elements, wherein the select circuitry comprises a select line signal generator, and wherein enabling the respective select line of each of the two or more latch elements comprises simultaneously generating a pulse signal on the respective select line of each of the two or more latch elements using the select line signal generator.

2. The system of claim 1, wherein the conducting line is concurrently driven by the two or more latch elements.

3. The system of claim 1, wherein the processing device is to further perform operations comprising:
    generating one or more third control signals to cause the select circuitry to select two or more additional latch elements by enabling a respective select line of each of the two or more additional latch elements,
    wherein an additional output data is determined based on a sensing of the conducting line driven by the two or more additional latch elements, and
    wherein the output data is validated by comparing the output data with the additional output data.

4. The system of claim 3, wherein the output data is placed onto a data bus responsive to validating the output data.

5. The system of claim 3, wherein a subset of the multiple copies of the stored data sensed into each of the two or more additional latch elements are bit-inverted copies of the stored data.

6. The system of claim 1, wherein the conducting line comprises a pair of differential lines, and
    wherein determining the output data based on the sensing of the conducting line comprises:
        sensing a differential voltage output between the pair of differential lines; and
        determining the output data by comparing the differential voltage output to threshold voltage criteria.

7. A method comprising:
    generating one or more first control signals to cause sense circuitry to sense multiple copies of a stored data from a subset of memory cells of an array of memory cells into a plurality of latch elements in a page buffer coupled to the array of memory cells; and
    generating one or more second control signals to cause select circuitry to select two or more latch elements by enabling a respective select line of each of the two or more latch elements, wherein an output data is determined based on a sensing of a conducting line driven by the two or more latch elements, and wherein enabling the respective select line of each of the two or more latch elements comprises simultaneously generating a pulse signal on the respective select line of each of the two or more latch elements using a select line signal generator.

8. The method of claim 7, wherein the conducting line is concurrently driven by the two or more latch elements.

9. The method of claim 7, further comprising:
generating one or more third control signals to cause the select circuitry to select two or more additional latch elements by enabling a respective select line of each of the two or more additional latch elements,
wherein an additional output data is determined based on a sensing of the conducting line driven by the two or more additional latch elements, and
wherein the output data is validated by comparing the output data with the additional output data.

10. The method of claim 9, wherein the output data is placed onto a data bus responsive to validating the output data.

11. The method of claim 9, wherein a subset of the multiple copies of the stored data sensed into each of the two or more additional latch elements are bit-inverted copies of the stored data.

12. The method of claim 9, wherein the conducting line comprises a pair of differential lines, and
wherein determining the output data based on the sensing of the conducting line comprises:
sensing a differential voltage output between the pair of differential lines; and
determining the output data by comparing the differential voltage output to threshold voltage criteria.

13. A non-transitory computer-readable storage medium comprising instructions that, when executed by a processing device, cause the processing device to perform operations comprising:
generating one or more first control signals to cause select circuitry to select two or more latch elements of a page buffer by enabling a respective select line of each of the two or more latch elements, wherein each of the two or more latch elements contain sensed copies of a stored data,
wherein an output data is determined based on a sensing of a conducting line driven by the two or more latch elements,
wherein the output data is placed onto a data bus responsive to validating the output data, and
wherein enabling the respective select line of each of the two or more latch elements comprises simultaneously generating a pulse signal on the respective select line of each of the two or more latch elements using a select line signal generator.

14. The non-transitory computer-readable storage medium of claim 13, wherein the processing device is to perform operations further comprising:
generating one or more second control signals to cause the select circuitry to select two or more additional latch elements of the page buffer by enabling a respective select line of each of the two or more additional latch elements, wherein each of the two or more additional latch elements contain sensed copies of the stored data,
wherein an additional output data is determined based on a sensing of a conducting line driven by the two or more additional latch elements, and
wherein the output data is compared with the additional output data to validate the output data.

15. The non-transitory computer-readable storage medium of claim 13, wherein the conducting line is concurrently driven by the two or more latch elements.

16. The non-transitory computer-readable storage medium of claim 14, wherein each of the two or more additional latch elements contain sensed bit-inverted copies of the stored data.

17. The non-transitory computer-readable storage medium of claim 13, wherein the conducting line comprises a pair of differential lines, and
wherein determining the output data based on the sensing of the conducting line comprises:
sensing a differential voltage output between the pair of differential lines; and
determining the output data by comparing the differential voltage output to threshold voltage criteria.

* * * * *